(12) United States Patent
Matteucci

(10) Patent No.: US 8,695,472 B2
(45) Date of Patent: Apr. 15, 2014

(54) MACHINE FOR CUTTING STRUCTURAL MEMBERS, SUCH AS LEGS, BEAMS, I-BEAMS OR THE LIKE FOR SUPPORTING STRUCTURES MADE OF STEEL, CONCRETE, STEEL AND CONCRETE, STONE-LIKE MATERIALS OR THE LIKE

(75) Inventor: Francesco Matteucci, Genoa (IT)

(73) Assignee: TS R&D S.R.L., Genoa (IT)

( * ) Notice: Subject to any disclaimer, the term of this patent is extended or adjusted under 35 U.S.C. 154(b) by 191 days.

(21) Appl. No.: 13/390,056

(22) PCT Filed: Aug. 3, 2010

(86) PCT No.: PCT/EP2010/061324
§ 371 (c)(1),
(2), (4) Date: Feb. 29, 2012

(87) PCT Pub. No.: WO2011/018396
PCT Pub. Date: Feb. 17, 2011

(65) Prior Publication Data
US 2012/0174723 A1    Jul. 12, 2012

(30) Foreign Application Priority Data
Aug. 13, 2009   (IT) ............................... GE2009A0066

(51) Int. Cl.
*B26D 1/46* (2006.01)
*B26D 1/547* (2006.01)

(52) U.S. Cl.
USPC .............. 83/794; 83/651.1; 83/784; 83/307.1

(58) Field of Classification Search
USPC .......... 83/794, 651.1, 784, 307.2, 954, 307.1, 83/307.3, 286, 753, 783, 788, 797, 813, 83/284, 285, 296, 356.2, 785, 647, 786, 83/756, 647.5, 758, 548, 781, 624; 125/21, 16.02, 12
See application file for complete search history.

(56) References Cited

U.S. PATENT DOCUMENTS

| 4,067,312 | A | * | 1/1978 | Tessner ........................... 125/21 |
| 5,226,404 | A | * | 7/1993 | Mogi et al. ...................... 125/21 |
| 6,520,061 | B2 | * | 2/2003 | Fukuta et al. ................. 83/651.1 |

FOREIGN PATENT DOCUMENTS

| EP | 0540834 | 5/1993 |
| EP | 1055498 | 11/2000 |
| EP | 1598161 | 11/2005 |
| WO | 93/08947 | 5/1993 |

OTHER PUBLICATIONS

PCT International Search Report issued on Nov. 5, 2010 for PCT/EP2010/0613124 filed on Aug. 3, 2010 in the name of TS R&D S.R.L.
PCT Written Opinion issued on Feb. 13, 2012 for PCT/EP2010/061324 filed on Aug. 3, 2010 in the name of TS R&D S.R.L.

* cited by examiner

*Primary Examiner* — Ghassem Alie
(74) *Attorney, Agent, or Firm* — Steinfl & Bruno, LLP

(57) ABSTRACT

A machine for cutting structural members is described. The machine has an endless travelling wire and a frame arranged around a structural member to be cut. The travelling wire and frame have longitudinal track with carriages with at least one pulley carrying at least one cutting segment. The longitudinal tracks are adapted to be engaged via motion means in arcuate guide slots.

14 Claims, 8 Drawing Sheets

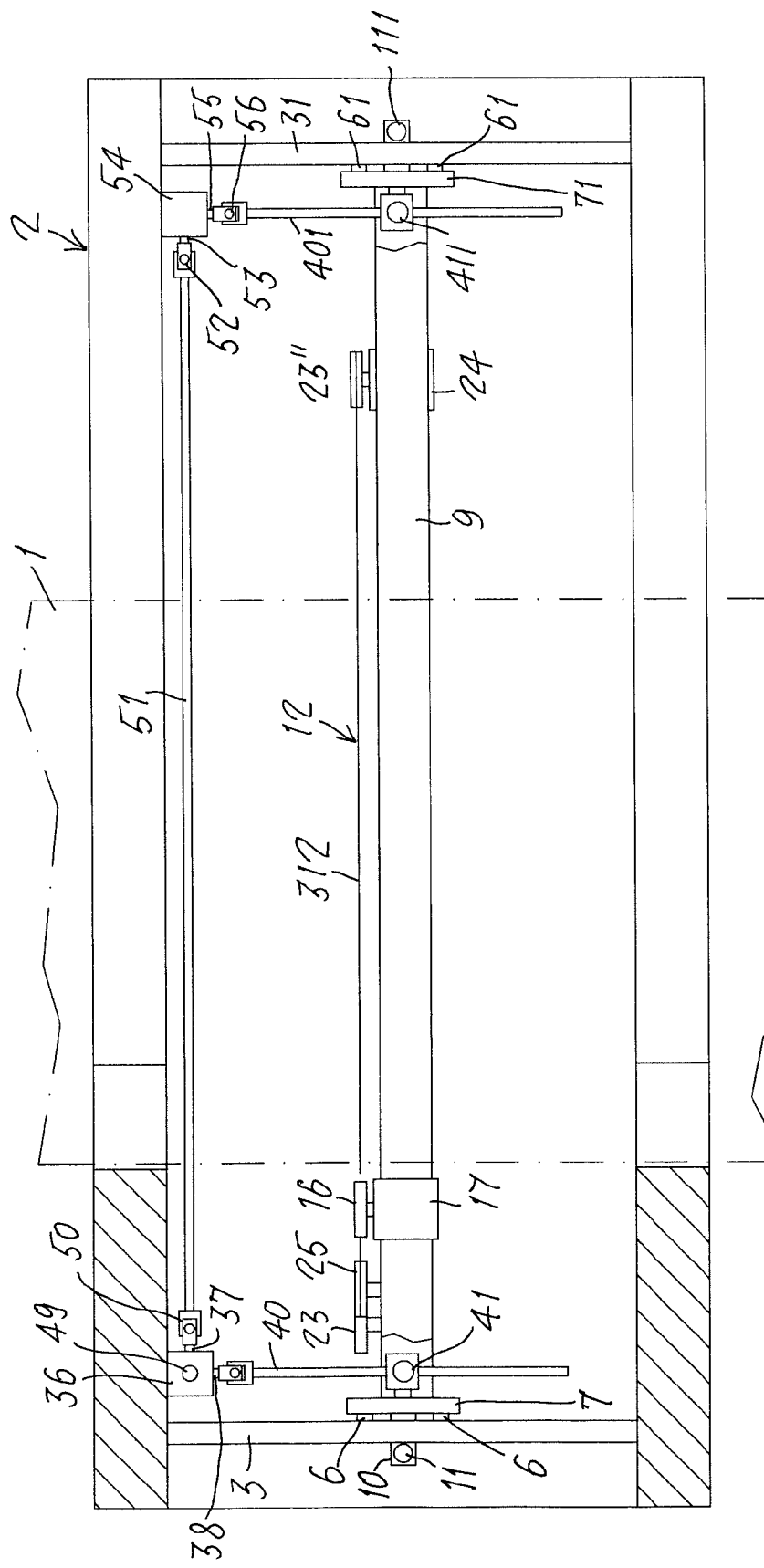

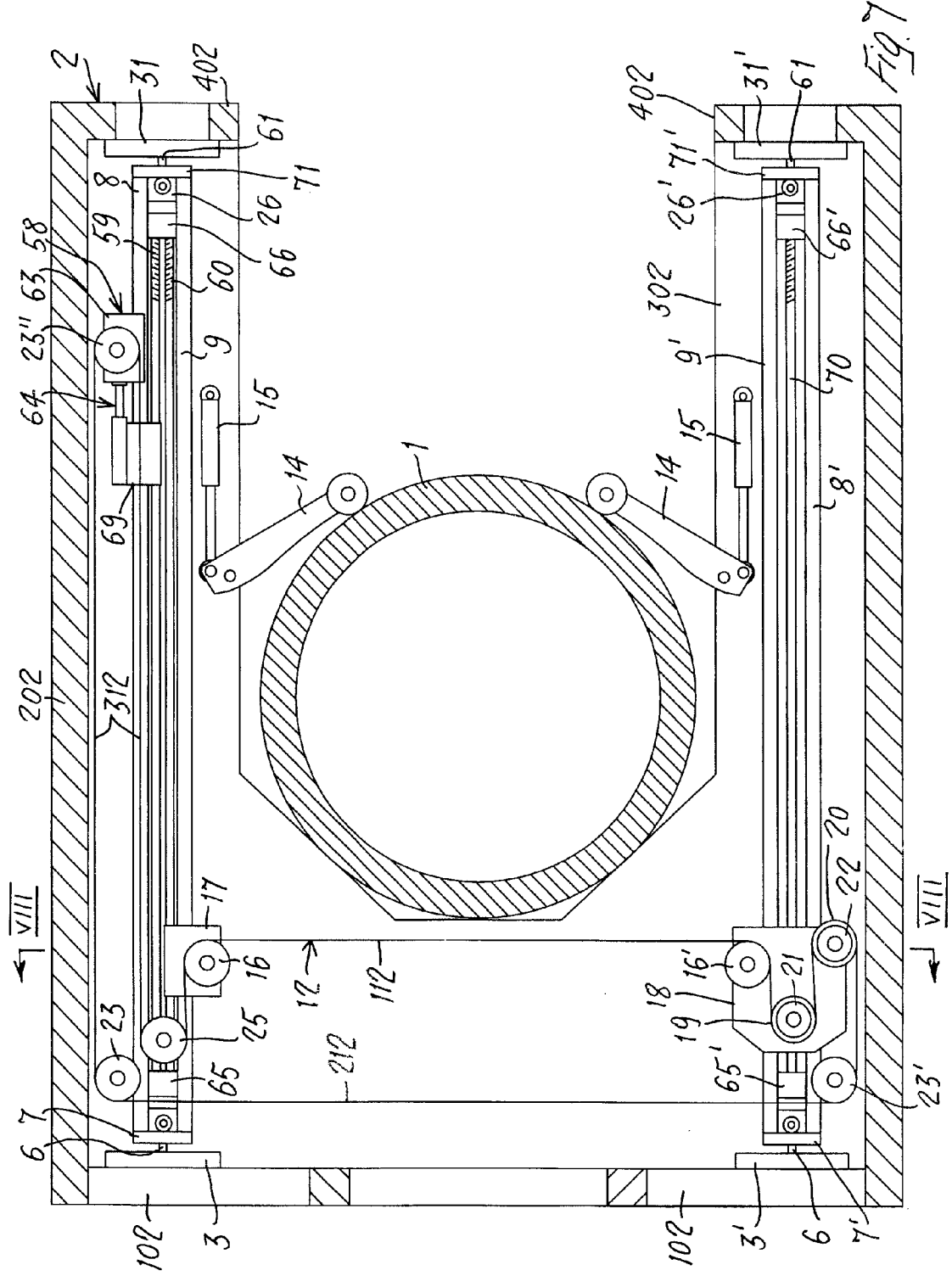

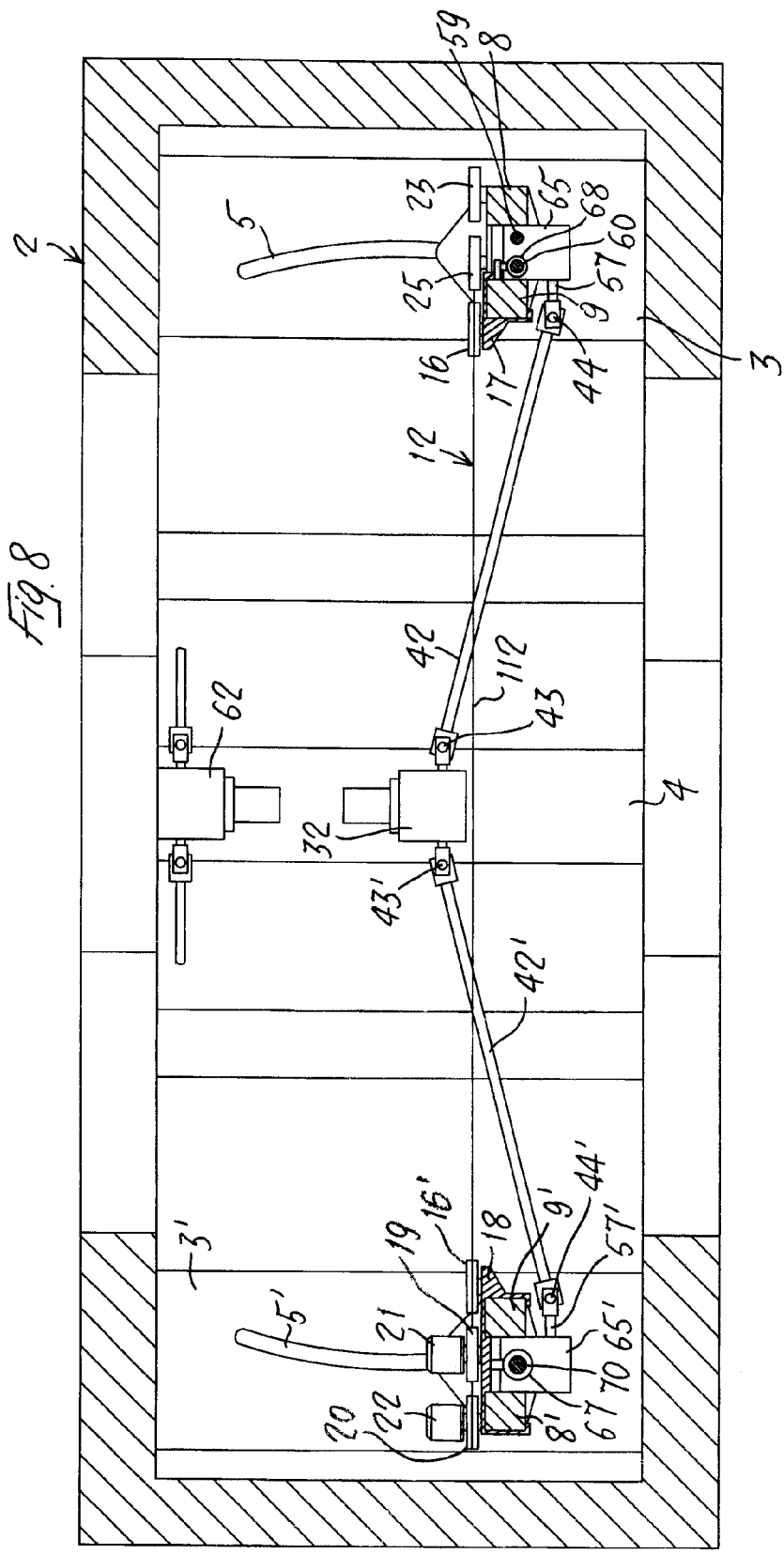

MACHINE FOR CUTTING STRUCTURAL MEMBERS, SUCH AS LEGS, BEAMS, I-BEAMS OR THE LIKE FOR SUPPORTING STRUCTURES MADE OF STEEL, CONCRETE, STEEL AND CONCRETE, STONE-LIKE MATERIALS OR THE LIKE

CROSS REFERENCE TO RELATED APPLICATIONS

The present application is the U.S. national stage of International Application PCT/EP2010/061324 filed on Aug. 3, 2010 which, in turn, claims priority to Italian Patent Application GE2009A000066 filed on Aug. 13, 2009.

FIELD

The present invention relates to a machine for cutting structural members, such as legs, beams, I-beams or the like for supporting structures made of steel, concrete, steel and concrete, stone-like materials or the like.

BACKGROUND

As is known from the technical field of cutting up structures, including subsea structures, of the kinds indicated above, use is made of cutting machines fitted with wires containing suitable cutting parts, such as so-called diamond wires. One of these cutting machines is disclosed in patent EP 0540834 B2, belonging to the proprietor of the present application. That machine comprises a diamond wire running around two pulleys positioned on slides able to move in an essentially horizontal direction along two suitable motion tracks. That machine, by means of the diamond wire, cuts the legs of for example a subsea structure in a single direction, generally horizontal and at right angles to the legs themselves.

As is also known, the supporting legs of a subsea structure, such as an oil platform standing on four legs fixed to the sea bed, must be cut one at a time. The cutting machine is therefore positioned appropriately on the first leg, and once it has cut the first leg it is transferred to another leg, and so on until it has cut all the legs of the structure at a certain height or depth. This leg cutting operation is very lengthy and must be carried out with the utmost safety and efficiency.

As mentioned above, each of the legs is cut in an essentially horizontal direction and therefore at right angles to the leg itself. This cut causes problems, because at the end of the cut the bottom part of each leg is still fixed to the sea bed while the top part is still connected to the supported structure but is disconnected and simply resting on the fixed bottom part. It could therefore slide against the latter, which would be highly undesirable. This risk of the top part of the leg sliding relative to the fixed bottom part is absolutely to be avoided as it could create serious problems of stability in the leg cutting operations, each of which legs, once cut, must be sufficiently stable, even with the top part simply resting on the bottom part fixed to the sea bed, to allow the remaining legs to be cut.

SUMMARY

The object of the present invention is therefore to provide a machine for cutting structural members, such as legs, beams, I-beams or the like for supporting structures made of steel, concrete, steel and concrete, stone-like materials or the like, which makes it possible to complete, in particular, the cutting of the legs of a subsea structure safely and efficiently, ensuring that each cut leg has sufficient stability to allow the remaining legs to be cut within the required time limits, and ensuring above all that the top part of the cut leg cannot slide or make any other horizontal movement relative to the bottom art, fixed to the sea bed, on which this top part simply rests when the cut is completed.

This object is achieved by the present invention with a machine for cutting structural members such as legs, beams, I-beams or the like for supporting structures made of steel, concrete, steel and concrete, stone-like materials or the like, comprising an endless travelling wire that has suitable cutting parts and at least one cutting segment running around at least two pulleys, and a frame arranged around a structural member to be cut; said machine being characterized in that it comprises, in this frame, longitudinal tracks on which carriages are positioned so as to be movable along these tracks by suitable actuating means, each carriage having at least one of these guide pulleys carrying the cutting segment of the travelling wire; these longitudinal tracks are attached at each end to plates able to engage via motion means in arcuate guide slots formed in the transverse wall and in the end walls of the frame; each of these plates is provided with suitable actuating means for moving them along these arcuate guide slots in such a way as to raise or lower at least one pair of these longitudinal tracks, thus obtaining a certain inclination of at least the cutting segment of the travelling wire with respect to a generally horizontal direction.

BRIEF DESCRIPTION OF DRAWINGS

Other features and advantages of the present invention will be understood more clearly in the course of the following description, considered by way of example, no limitation being implied, and with reference to the appended drawings, in which:

FIG. 6 is a view of the present machine considered in longitudinal section on the plane marked VI-VI in FIG. 2;

FIG. 7 is a plan view, partially in section, of a variant of the present cutting machine, in which a leg is positioned for cutting; and FIG. 8 is a view of the present machine considered in transverse section on the plane marked VIII-VIII in FIG. 7, showing a diamond cutting wire in a generally horizontal position.

DETAILED DESCRIPTION

Figure 1:
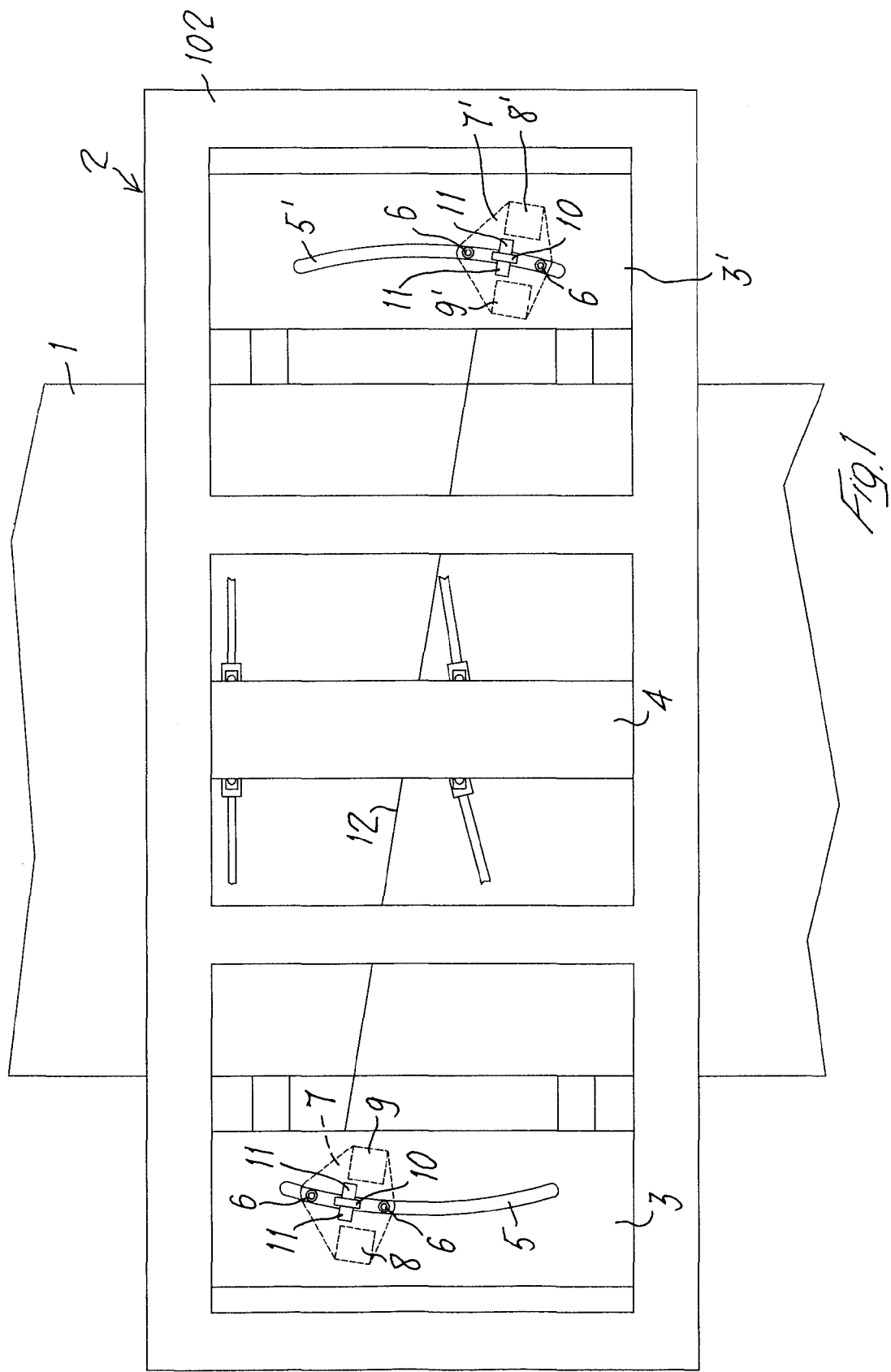
FIG. 1 is a front view of a frame of a machine for cutting tubular members, especially legs for supporting structures made of steel, concrete, steel and concrete, stone-like materials or the like, according to the present invention.

Referring to these appended drawings, and with particular reference to FIG. 1, reference 1 denotes a structural member which is to be cut into two parts by the present cutting machine. This tubular member, as mentioned earlier, may be a supporting leg of a subsea structure, such as an oil platform or the like. This leg is positioned within a frame 2 comprising a transverse wall 102 to which three panels 3, 3' and 4 are attached. In the lateral panels 3 and 3' of the frame 2, arcuate guide slots 5 and 5' are formed, and in each of these there moves a pair of idle guide rollers 6 mounted on suitably shaped plates 7 and 7'. Fixed to each of these plates 7 and 7' are the ends of two track length members 8, 9 and 8', 9' which are positioned (see FIG. 2) parallel to a general longitudinal direction L of the machine and in the side walls 202 of the machine frame 2. Each of these plates 7 and 7' is provided in the centre with a pin 10 to which are fixed, one per side with respect to the arcuate guide slots 5 and 5', two idle rollers 11 that move on the surface of the panels 3 and 3'. This central pin 10 of the plates 7 and 7' passes through the guide slot 5 and 5' from the inside to the outside of the frame 2 and thus advantageously prevents undesirable lateral movements with respect to a longitudinal axis of symmetry of the frame 2, by the length members, when the machine is running. The cutting segment 112 of an endless diamond wire suitable for cutting the leg 1 can be glimpsed through the transverse wall 102 of the frame 2.

The frame 2 of the present machine comprises (see FIG. 2), in addition to the transverse wall 102, the two side walls 202, a base 302 and two end walls 402, so that it is generally U-shaped. Between the two end walls 402, the frame 2 is open and contains a seat 13 to house the leg 1 to be cut. The transverse wall 102 of the frame 2 is brought towards this leg 1 until it contacts the suitably shaped edges of the base 302 of this frame 2. The machine is held in position around the leg 1 by two locking arms 14 actuated by suitable, e.g. hydraulic, actuator means 15. Fixed to each of the two end walls 402 of the frame is a panel 31, 31' exactly like the panels 3, 3' of FIG. 1, i.e. comprising an arcuate guide slot identical to the slot 5, 5' in FIG. 1. The panels 3, 3', 31 and 31' are all positioned at the same height and in addition the panel 3 and the panel 31, like the panel 3' and the panel 31', are aligned with each other longitudinally. The pairs of length members 8, 9 and 8', 9' are fixed, at the ends nearest the end walls 402 of the frame, to two plates 71 and 71' exactly like the plates 7 and 7' and also supporting the pairs of rollers 61 which fit into the corresponding arcuate guide slots formed in the panels 31 and 31'.

The present machine comprises an endless travelling diamond wire 12 which includes a cutting segment 112, a return segment 212, and two slack take-up segments 312. The cutting segment 112 of the diamond wire 12 is wrapped around a pair of idle pulleys 16 and 16' which are lined up transversely with respect to the machine frame 2 so that the cutting segment 112 is directly transverse with respect to the leg 1 to be cut. These pulleys 16 and 16' are positioned on a first carriage 17 and a second carriage 18, respectively. The carriage 17 is positioned on the length member 9 and is able to move along the latter, while the carriage 18 is positioned on both the length members 8' and 9' and is able to move along these. This second carriage also carries a pair of pulleys 19 and 20 fitted with respect to rotary motors 21 and 22. The diamond wire 12 is passed around these pulleys 19 and 20 and then returned to two idle pulleys 23 and 23', which are aligned transversely and fixed, unlike the pulleys 16, 16', 19 and 20 which are arranged, as stated, on moving carriages 17 and 18. The slack take-up segments 312 of the diamond wire 12 are passed around the fixed pulley 23 and around another pair of pulleys: a first pulley 23" mounted on a third carriage 24 moving along the length member 8 and aligned longitudinally with the pulley 23; and a second, fixed pulley 25 positioned towards the transverse wall 102 of the frame 2 in the vicinity of the fixed pulley 23. The diamond wire is then returned by the fixed pulley 25 to the pulley 16, thus making a closed loop. Between each pair of length members 8, 9 and 8', 9' is a longitudinal seat 26 and 26' in which means for the longitudinal translational movement of the carriages 17, 18 and 24 are positioned: these means of translational movement may be screws 59, 60 and 70, illustrated in the version of the machine shown in FIG. 7, or drive chains 29 and 29', as illustrated in the version shown in the present figure. When drive chains 29 and 29' are used, a motorized roller 27 and 27' is positioned at one end of each of said longitudinal seats 26 and 26', and an idle guide roller 28 and 28' at the other end. Each of the two motorized rollers 27 and 27' is connected to its corresponding guide roller 28 and 28' by this drive chain 29 and 29', which is actuated by the motorized roller 27 and 27'. Each drive chain 29 and 29' comprises two segments: an inner segment 129 and 129' and an outer segment 229 and 229': the first carriage 17 is mounted on the inner segment 129 of the drive chain 29, while the second carriage 18 is mounted on the inner segment 129' of the drive chain 29', so that when the machine is running these carriages 17 and 18 move translationally in synchronization forwards or backwards along the length member 9 and the pair of length members 8' and 9', respectively. The third carriage 24 is mounted on the outer segment 229 of the drive chain 29.

On the central panel 4 of the transverse wall 102 of the frame 2 of the present machine (see FIG. 3 of the appended drawings) are two geared motors 62 and 32. The geared motor 62 turns, simultaneously, a pair of shafts 34 and 34' positioned at the same height on opposite sides of this geared motor 62 in an essentially horizontal direction at right angles to the frame 2 of the machine and to the length members 8, 9, 8', 9'. Each of these shafts 34 and 34' is connected at each end to a universal joint: the universal joints 33 and 33' which connect these shafts 34 and 34' to the drive shaft of the geared motor 62 and the universal joints 35 and 35' which connect each of these shafts to a shaft 49, 49' projecting from a bevel gear 36, 36', whose seat is fixed to the walls of the frame 2. From each of these bevel gears 36 and 36' there projects a first or longitudinal shaft 37, 37', whose function will be explained below, and a second or vertical shaft 38, 38' connected by a universal joint 39, 39' to one end of a screw 40, 40'. The other end of this screw 40, 40' is not attached to anything and is fed through a nut 41, 41' mounted on the associated plate 7, 7'.

Figure 2:
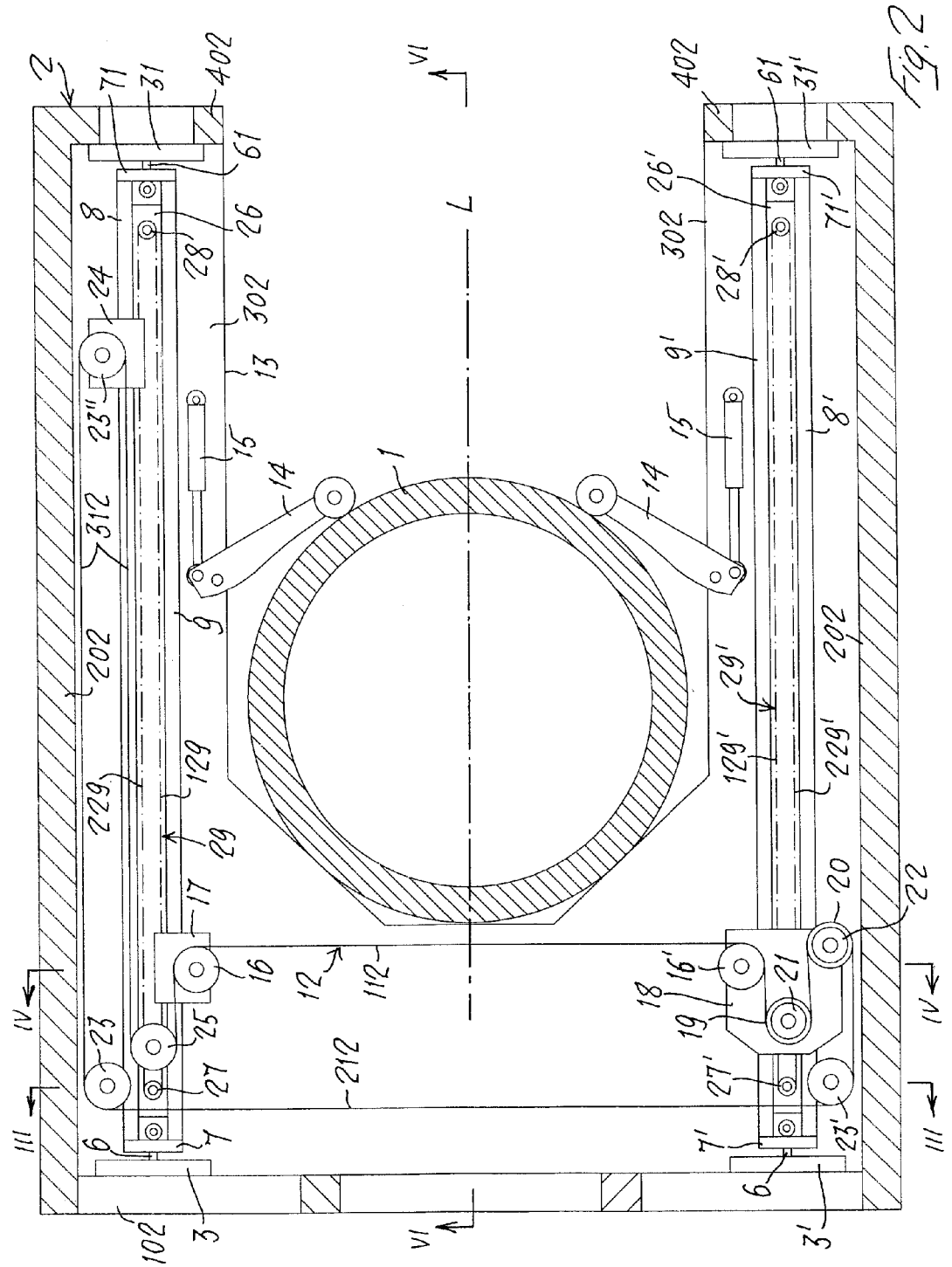
FIG. 2 is a plan view and partial cross section of the present cutting machine in which a leg is positioned for cutting.

The job of the geared motor 32 is to turn the rollers 27 and 27' which move the drive chains 29 and 29' seen in FIG. 2. This geared motor 32 turns, simultaneously (see FIG. 4), two shafts 42 and 42', one on each side of the geared motor. Each of these shafts 42 and 42' has a universal joint at each end: the universal joints 43 and 43' connecting these shafts 42 and 42' to the drive shaft of the geared motor 32, and the universal joints 44 and 44' connecting each of these shafts to a corresponding shaft 57, 57' projecting from a bevel gear 45, 45'. These bevel gears 45 and 45' transmit the rotary movement to the respective rollers 27 and 27', respectively, which move the drive chains 29 and 29'. It will also be noticed that the carriage 17, as mentioned earlier, is positioned on the length member 9, while the carriage 18, which carries the pulleys 19 and 20 having the motors 21 and 22, respectively, is positioned on both of the length members 8' and 9'.

Figure 5:
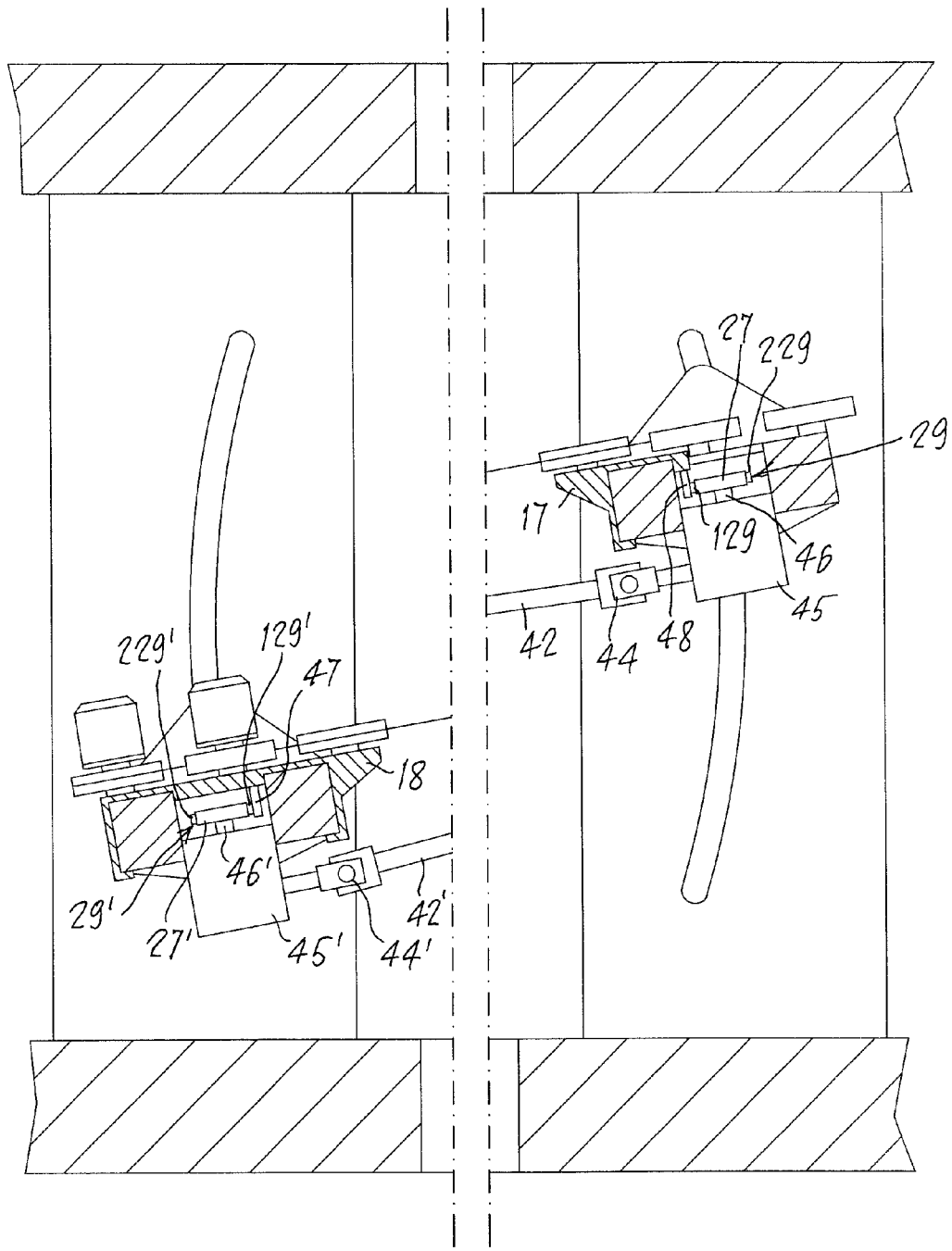
FIG. 5 is a view in greater detail of the two carriages illustrated in FIG. 4.

The cross section shown in FIG. 5 shows more clearly the rollers 27 and 27', each connected to its own shaft 46, 46' projecting from the associated bevel gear 45, 45'. The two segments 129 and 229 of the drive chain 29 run around the roller 27, while the two segments 129' and 229' of the drive chain 29' run around the roller 27'. The carriage 18 is connected, by its attached pin 47, to the inner segment 129' of the chain 29', while the carriage 17 is connected, by its attached pin 48, to the inner segment 129 of the drive chain 29.

Figure 3:
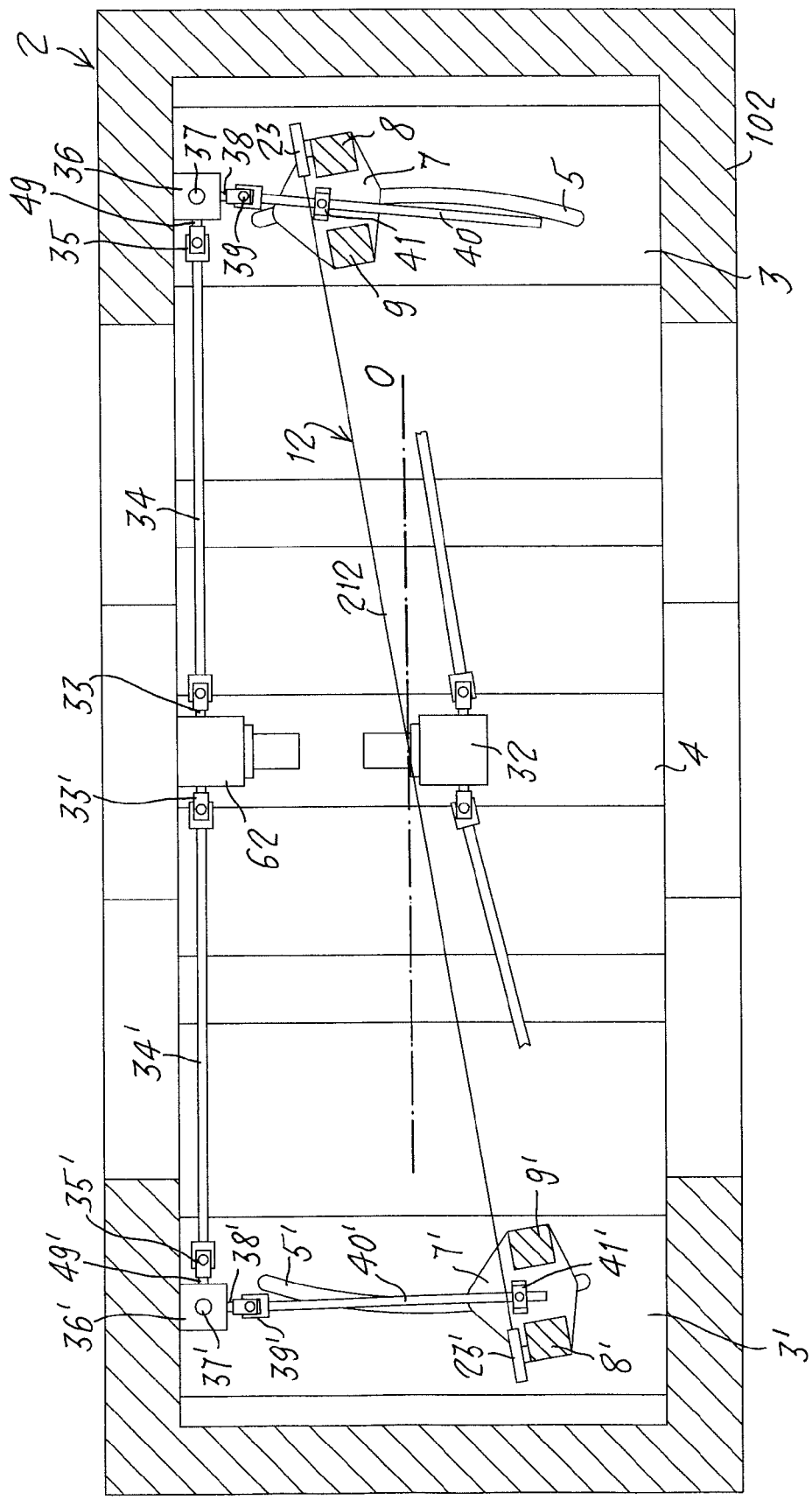
FIG. 3 is a view of the present machine considered in transverse section on the plane marked 111-111 in FIG. 2.

As mentioned earlier, the longitudinal shafts 37 and 37' project from the bevel gears 36 and 36' described in FIG. 3.

FIG. 6, which shows a longitudinal section through the present machine, shows the bevel gear 36 from which the vertical shaft 38 and the longitudinal shaft 37 project. This longitudinal shaft 37 is connected by a first universal joint 50 to another longitudinal shaft 51, which runs practically the whole length of the frame 2 and is connected, by a second universal joint 52, to a shaft 53 projecting from the bevel gear 54. A vertical shaft 55 projects from this bevel gear 54, exactly like the bevel gear 49, and is connected by a universal joint 56 to a screw 401 running in a nut 411. This nut 411, like the nut 41 of the plate 7, is fixed to the plate 71. This plate 71, as mentioned in the description of FIG. 2, is exactly like the plate 7 and thus comprises the pair of rollers 61, similar to the rollers 6 on the plate 7, which fit into an arcuate guide slot (not visible in the figure) formed in the panel 31, and the rollers 111 which move over the surface of this panel 31. The screws 40 and 41 shown in the figure are therefore connected by the drive elements described above and make it possible to synchronously raise and lower the pair of length members 8 and 9 along the arcuate guide slots in the panels 3 and 31 of the frame 2 of the present machine. A drive system exactly like that described above is also provided for the pair of length members 8', 9', whose ends are attached to the plates 7' and 71'.

As mentioned earlier, the means for transmitting the longitudinal translational movement to the carriages 17, 18 and 24 may be screws 59, 60 and 70 shown in FIG. 7. This figure also shows a double carriage 58 for tensioning and taking up slack in the wire 12. It comprises a first part 69 which moves along the length member 8 and a second part 63 carrying the guide pulley 23" of the diamond wire 12. These parts 69 and 63 of the carriage 58 are connected by an actuator 64 which has a piston for decreasing or increasing the distance between said parts 69 and 63 based on the amount of slack to be taken up. In other words, if the cutting segment 112 of the wire 12 assumes a horizontal configuration like that shown in FIG. 8 and the length members 8, 9, 8', 9' are moving parallel to each other upwards or downwards in the slots 5 and 5', then, because these length member raising or lowering slots 5 and 5' are arcuate, it may or may not be necessary to take up a certain length of the diamond wire 12 during this upward or downward movement of the length members and hence of the cutting member 112, and this is done by reducing or increasing the distance between said parts 69 and 63 of the double carriage 58 controlled by the actuator 64, which, in short, ensures that the tension in the cutting segment 112 of the diamond wire 12 is always correct.

The longitudinal track 26' houses a single screw with a drive box 65' and 66' at each end: in particular this screw will receive the motion from the geared motor 32 via the drive box 65'—see FIG. 8. Likewise the two screws 59 and 60 provided in the longitudinal seat 26 formed between the pairs of length members 8 and 9 will be provided with their own drive boxes 65 and 66. The carriage 18 moves along the screw 70, while the carriage 17 moves along the screw 60, which is identical to the screw 70 and rotates in the same direction as the latter. The first carriage 62 moves along the screw 59, whose pitch is identical to the pitch of the screws 70 and 60, but which rotates in the opposite direction to the screw 60. In this way the carriages 17 and 18 advance or retreat along the length members 9, 8', 9' by equal amounts and simultaneously the carriage 64 retreats or advances by equal amounts along the length member 8. FIG. 8 also shows the nut 67 attached to the carriage 18 and engaged on the screw 70, and the nut 68 attached to the carriage 17 and engaged on the screw 60. The geared motor 32 will transmit its rotary motion via the drive boxes 65 and 65' to the screw 70 and to the two screws 59 and 60, respectively.

FIG. 3 illustrates the endless diamond wire 12 at a certain angle with respect to a general horizontal direction O. To achieve this inclination of the diamond cutting wire 12, the plate 7' moves down along the arcuate slot 5' of the panel 3' and the plate 7 moves up along the arcuate slot 5 of the panel 3. What happens is that when the geared motor 62 turns, it turns the shafts 34 and 34' which transmit their motion to the bevel gears 36 and 36' and hence to the screws 40 and 40', which create an equal and opposite movement in such a way that when one plate moves down a certain distance—in this case the plate 7' along the slot 5'—the other plate—in this case the plate 7 along the slot 5—simultaneously moves upwards the same amount. The motion of the plates 7 and 7' on the transverse wall 102 of the frame 2 is identical to the motion of the corresponding plates 71 and 71' on the end walls 402 of the frame, because the motion is transmitted by the two longitudinal shafts, of which shaft 51 is described in relation to FIG. 6, so that, as noted earlier, the pairs of length members 8', 9' and 8, 9 move up and down simultaneously, being connected to the respective plates 7, 71 and 7', 71'.

To cut through the leg 1 (see FIG. 2, FIG. 4, FIG. 7 and FIG. 8) the cutting segment 112 of the diamond wire 12 must be advanced. Therefore, by actuating the geared motor 32, the shafts 42 and 42' are rotated. These transmit the motion, via the bevel gears 45 and 45', to the two simultaneous actuating rollers 27 and 27' of the drive chains 29 and 29' or to the screws 59, 60 and 70. The actuation of these drive chains or screws causes the carriages 17 and 18 to advance along the length member 9 and length members 8', 9', respectively, towards the leg 1, and simultaneously causes the carriage 24 or double carriage 64 to retreat along the length member 8 so as to take up the slack in the endless diamond wire 12. In essence, if the carriages 17 and 18 travel a certain distance in a certain direction, towards or away from the leg (at the end of the cut), the carriage 24 or the double carriage 64 will travel an equal and opposite distance to that of these two carriages 17 and 18. To perform the cut, moreover, the endless diamond wire 12 is set in motion by the rotary motors 21 and 22 of the pulleys 19 and 20. Alternatively, to make the shafts 34 and 34', which are turned by the motor 62, independent of each other, the geared motor 62 may be replaced by two motors, or by suitable control means known per se that turn only one of the two shafts, namely shaft 34 or shaft 34'. The effect of this would be to cause only one pair of plates 7, 71 or 7', 71' to move along their particular arcuate guide slots, in such a way as to raise or lower only one pair of length members 8, 9 or 8', 9'. The diamond wire 12 will equally be inclined with respect to the horizontal direction O but this inclination will be obtained by raising or lowering only one pair of length members. Furthermore, these plates 7, 7', 71, 71' could be operated, in order to move in their arcuate guide slots, not by a single geared motor 62, but rather, each by an independent motor, with drive means if necessary.

As already seen in FIG. 8, moreover, the length members 8, 8', 9, 9' can be raised and lowered simultaneously along the arcuate slots provided in the plates 3, 31, 3', 31' while keeping the diamond wire 12 essentially horizontal.

Figure 4:
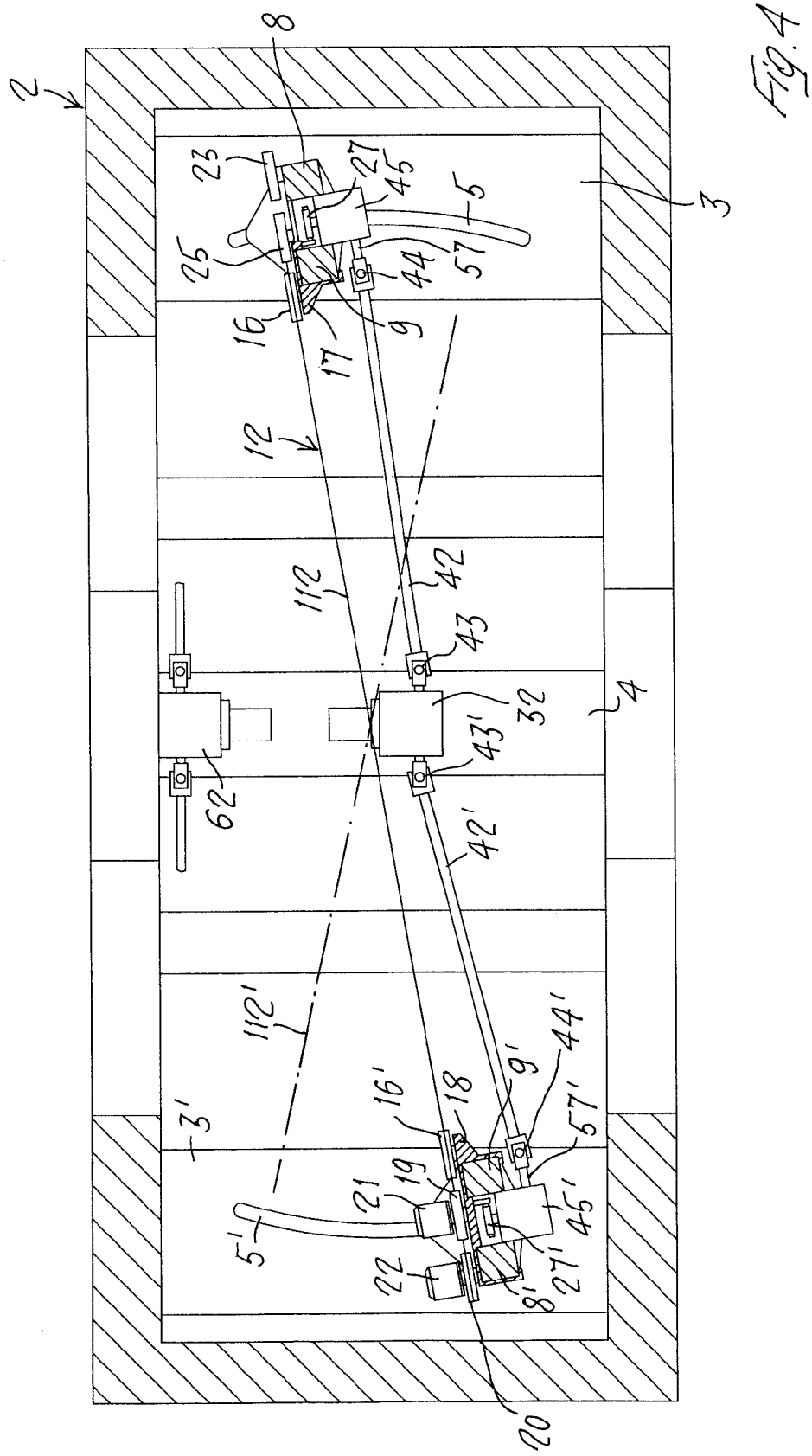
FIG. 4 is a view of the present machine considered in transverse section on the plane marked IV-IV in FIG. 2, showing two moving carriages supported on length members.

The present machine can be used to perform a method of cutting tubular parts disclosed in a simultaneous application belonging to the owners of the present application, in which legs are cut at any inclination with respect to a horizontal direction O: using the cutting segment 112 of the diamond wire, positioned as in FIGS. 2 and 4, a first inclined cut is made in a transverse direction to the leg 1; next, when the cutting segment 112 has entered a certain distance into this leg 1, a second cut is made, lengthwise with respect to the leg; the diamond wire is then rotated into a position, indicated in chain lines 112' in FIG. 4, which is symmetrical with respect to the previous or starting position, by moving the plates 7, 7', 71 and 71' around the guides in the panels 3, 31, 3' and 31'; and finally a third cut is made transversely across the leg until the cutting segment 112' emerges from the leg 1. This cuts the leg in such a way that the top part, now cut free of the bottom part, cannot slide on the bottom part, which is still anchored to the sea floor or bed, if the tubular member to be cut is a leg of a subsea structure. With the present machine it is therefore possible to cut through tubular supporting members of structures with the utmost safety and within the timescales required and necessary for the cutting of each of the tubular supporting members, without running the risk of compromising the stability of the structure and the success of the operation.

The invention claimed is:

1. A machine for cutting structural members, the machine comprising:
   an endless travelling wire having cutting parts and at least one cutting segment around at least two pulleys; and
   a frame arranged around a structural member to be cut, said frame comprising:
      longitudinal tracks having a plurality of carriages positioned to be movable along said longitudinal tracks by a first actuating means, each carriage of the plurality of carriages having at least one of said two pulleys carrying the at least one cutting segment of the travelling wire, said longitudinal tracks being attached at each end to plates adapted to be engaged via motion means in arcuate guide slots formed in a transverse wall and in end walls of the frame, each plate of said plates being provided with a second actuating means for moving said plates along said arcuate guide slots to raise or lower at least one pair of said longitudinal tracks.

2. The machine according to claim 1, wherein each of said plates of the transverse wall and end walls of the frame comprises a nut such that screws are adapted to be engaged in a substantially vertical or slightly inclined direction, said screws adapted to rotate in order to move the said plates along associated arcuate guide slots and thereby raise or lower at least one pair of the longitudinal tracks by means of an associated geared motor having a drive means.

3. The machine according to claim 2, wherein said plates are actuated along their arcuate guide slots by a single geared motor mounted on a transverse wall of the frame and adapted to turn simultaneously with said plates or independently, the machine further comprising two shafts positioned substantially horizontally and on opposite sides of said motor, each of said two shafts being connected to at least one bevel gear to which one of said screws is connected, and to a shaft directed along a longitudinal direction of the frame and adapted to transmit motion via a second bevel gear to a screw of the plate located on the end wall of the frame at opposite end and substantially longitudinally aligned with a corresponding plate located at the transverse wall.

4. The machine according to claim 1, wherein each of said longitudinal tracks comprises two length members connected at each end to said plates and idle rollers attached to move in said arcuate guide slots.

5. The machine according to claim 1, wherein each of said arcuate guide slots is formed in a panel positioned in the transverse wall and in each of the end walls of the frame, each of said plates being provided on each side of said arcuate guide slot with at least one idle roller adapted to move on a corresponding panel, and said idle roller being connected to a central pin passing through said arcuate guide slots.

6. The machine according to claim 1, wherein each of said carriages carrying the two pulleys for the cutting segment comprises nuts engaged on screws positioned in seats formed between each of said pairs of length members, said screws adapted to turn by suitable actuating means.

7. The machine according to claim 1, wherein one of said seats formed between said pairs of length members houses a third screw rotating in an opposite direction to said screws of said carriages carrying the two pulleys of the cutting segment, the third screw carrying a third carriage for tensioning and taking up slack of the travelling wire.

8. The machine according to claim 7, wherein said third carriage is a dual carriage and comprises a first part adapted to move along one of said length members and a second part supporting one of the two pulleys for the travelling wire, said first part and said second part of the third carriage being connected by an actuator adapted to vary a distance between said first part and said second part based on an amount of wire desired to be taken up.

9. The machine according to claim 1, wherein each of said plurality of carriages carrying each of the two pulleys of the cutting segment is connected to at least one segment of a drive chain positioned on each side wall of the frame to pull said plurality of carriages along said longitudinal tracks, said drive chain being guided around two rollers, wherein at least one of said two rollers is rotated by movement of the drive chain produced by said first actuating means.

10. The machine according to claim 1, further comprising at least one geared motor adapted to turn two shafts, each of the two shafts being connected to the at least one geared motor on opposite sides of the motor, the at least one geared motor adapted to transmit motion via a drive means, to said drive rollers of drive chains or to said screws.

11. The machine according to claim 10, wherein each of said drive chains is positioned in seats formed between each of two length members.

12. The machine according to claim 1, wherein said cutting segment of the travelling wire runs around a first idle pulley positioned on a first carriage moving on one length member of a first pair of length members and around a second idle pulley positioned on a second carriage moving on both length members of the first pair of length members, the second carriage carrying travelling-wire guide pulleys having motors for actuating said travelling wire.

13. The machine according to claim 9, wherein said travelling wire comprises two slack take-up segments around a series of idle pulleys, one of said series of idle pulleys being positioned on a third carriage moving on a length member of a pair of length members, and said third carriage being connected to a segment of the drive chain.

14. The machine according to claim 1, wherein said travelling wire includes a return segment around a pair of idle pulleys positioned on the transverse wall of the frame.

* * * * *

UNITED STATES PATENT AND TRADEMARK OFFICE
CERTIFICATE OF CORRECTION

PATENT NO. : 8,695,472 B2 Page 1 of 1
APPLICATION NO. : 13/390056
DATED : April 15, 2014
INVENTOR(S) : Francesco Matteucci It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 207 days.

Signed and Sealed this
Twenty-ninth Day of September, 2015

Michelle K. Lee
*Director of the United States Patent and Trademark Office*